(12) United States Patent
Lien et al.

(10) Patent No.: US 9,470,925 B2
(45) Date of Patent: Oct. 18, 2016

(54) LIQUID CRYSTAL DISPLAY DEVICE

(71) Applicant: Shenzhen China Star Optoelectronics Technology Co., Ltd., Shenzhen, Guangdong (CN)

(72) Inventors: Shuichih Lien, Guangdong (CN); Chihtsung Kang, Guangdong (CN); Yicheng Kuo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/428,356

(22) PCT Filed: Oct. 28, 2014

(86) PCT No.: PCT/CN2014/089620
§ 371 (c)(1),
(2) Date: Mar. 14, 2015

(87) PCT Pub. No.: WO2016/049961
PCT Pub. Date: Apr. 7, 2016

(65) Prior Publication Data
US 2016/0091752 A1    Mar. 31, 2016

(30) Foreign Application Priority Data

Sep. 30, 2014 (CN) .......................... 2014 1 0524620

(51) Int. Cl.
*G02F 1/1335* (2006.01)
*F21V 8/00* (2006.01)

(52) U.S. Cl.
CPC ....... *G02F 1/133504* (2013.01); *G02B 6/0055* (2013.01); *G02B 6/0056* (2013.01);

(Continued)

(58) Field of Classification Search
CPC .............. G02F 1/133504; G02F 1/133526; G02F 1/133528; G02F 1/133514; G02F 1/133553; G02F 2001/133507; G02F 2001/133548; G02B 6/0073; G02B 6/0056; G02B 6/0053

See application file for complete search history.

(56) References Cited

U.S. PATENT DOCUMENTS 5,691,788 A * 11/1997 Kim .................. G02F 1/133504
349/110
7,804,564 B2 * 9/2010 Min ..................... G02B 3/0043
349/112

(Continued)

FOREIGN PATENT DOCUMENTS

CN    101487940 A    7/2009
CN    101696785 A    4/2010

*Primary Examiner* — Donald Raleigh
(74) *Attorney, Agent, or Firm* — Andrew C. Cheng

(57) ABSTRACT

A liquid crystal display device includes a liquid crystal panel and a collimated exit light backlight module. The liquid crystal panel includes a CF substrate, an array substrate, and a liquid crystal layer. The CF substrate has an upper surface on which an upper polarizer film is arranged. The array substrate has a lower surface on which a lower polarizer film is arranged. The upper polarizer film includes a view angle diffusion film arranged thereon. The collimated exit light backlight module includes two backlight sources, a metallic grating reflector plate, a wire grid polarizer, and an optic film assembly. The two backlight sources, the metallic grating reflector plate, and the wire grid polarizer collectively define a light guide chamber. The liquid crystal display device greatly improves light transmittance and light extraction efficiency and also effectively overcomes the issue of color deviation at a large view angle.

7 Claims, 3 Drawing Sheets

(52) U.S. Cl.
CPC ... *G02F1/133514* (2013.01); *G02F 1/133526* (2013.01); *G02F 1/133528* (2013.01); *G02F 1/133553* (2013.01); *G02B 6/0053* (2013.01); *G02B 6/0073* (2013.01); *G02F 2001/133507* (2013.01); *G02F 2001/133548* (2013.01)

(56) References Cited

U.S. PATENT DOCUMENTS

| | | | | |
|---|---|---|---|---|
| 2008/0002105 A1* | 1/2008 | Park | ............... | G02F 1/133526 349/95 |
| 2008/0084517 A1* | 4/2008 | Itou | ............... | G02F 1/133555 349/62 |
| 2010/0171906 A1* | 7/2010 | Sakai | ............... | G02B 3/005 349/96 |
| 2013/0033662 A1* | 2/2013 | Chung | ............... | G02F 1/133528 349/96 |
| 2014/0313774 A1* | 10/2014 | Myers | ............... | F21K 9/52 362/612 |
| 2015/0069224 A1* | 3/2015 | Yoshimura | ............... | B60S 1/0833 250/227.14 |
| 2015/0234229 A1* | 8/2015 | Kim | ............... | G02F 1/133528 349/42 |

* cited by examiner

US 9,470,925 B2

LIQUID CRYSTAL DISPLAY DEVICE

BACKGROUND OF THE INVENTION

1. Field of the Invention

The present invention relates to the field of liquid crystal display technology, and in particular to a liquid crystal display device.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

Most of the currently available liquid crystal displays are backlighting liquid crystal displays, which comprise an enclosure, a liquid crystal panel arranged in the enclosure, and a backlight module mounted in the enclosure. The liquid crystal panel itself does not emit light and light must be supplied from the backlight module to the liquid crystal panel in order to normally display images FIG. 1 shows a schematic view of a conventional liquid crystal display device. The structure of a conventional liquid crystal panel 100 is made up of a color filter (CF) substrate 110, a thin-film transistor (TFT) array substrate 130, and a liquid crystal layer filled between the two substrates and the principle of operation is that a driving voltage is applied to the CF substrate 110 and the array substrate 130 to control rotation of the liquid crystal molecules of the liquid crystal layer in order to control the amount of output light for refracting out light emitting from a backlight module 300 to generate images. The CF substrate 100 has an upper surface on which an upper polarizer film 150 is attached and the CF substrate 100 has a lower surface on which color resist is arranged by taking pixels as units. The array substrate 130 has a lower surface on which a lower polarizer film 170 that is normal to the upper polarizer film 150 in directions of axes thereof. The array substrate 130 has an upper surface on which TFT switches are provided for charging/discharging of the pixels. Formed atop the TFT switches is an indium tin oxide (ITO) electrode that controls the liquid crystal layer. The ITO electrode is arranged in a pattern that can be designed as an electrode pattern that is fit for a twisted nematic (TN) mode, or as a pattern that is fit for one-domain, two-domain, four-domain, or eight-domain vertical alignment (VA) mode, or a pattern that is fit for one-domain, two-domain, or four-domain in-plane switching (IPS) mode.

A conventional backlight module 300 comprises a backlight source 310, a light guide plate 330, a bottom reflector plate 350, and an optic film assembly 370. The backlight source 310 can be a light-emitting diode (LED), a cold cathode fluorescent lamp (CCFL), or a hot cathode fluorescent lamp (HCFL). The optic film assembly 370 comprises a diffuser film, a bright enhancement film, and a protection film.

The conventional liquid crystal television produces often adopt a driving method of a VA mode solution or an IPS mode solution in order to expand the view angle of displaying. The VA mode has advantages of high yield rate and high throughput; however, to reduce color shift for displaying at large view angles, the ITO electrode must adopt the eight-domain solution to improve color deviation at large view angles. Using ITO electrode of the eight-domain pattern would lead to a reduction of the yield rate of a manufacturing process, a reduction of the aperture ratio, a reduction of liquid crystal performance, and a reduction of light transmittance, and thus the cost of the backlight module is indirectly increased. On the other hand, using a two-domain or one-domain VA mode solution allows for a signification increase of light transmittance, but color deviation becomes apparently severe at large view angles.

Further, since a display panel of a liquid crystal television needs a large view angle for watching and view angel brightness must satisfy the view angle specification of ½ brightness or ⅓ brightness. The optic film assembly of the backlight module needs to have a relatively large light-exit view angle. Since the light transmittance of the liquid crystal panel at a large view angle is reduced, the light extraction performance of the backlight module gets deteriorated and the large view angle color deviation issue of the liquid crystal panel is made apparently identifiable.

SUMMARY OF THE INVENTION

An object of the present invention is to provide a liquid crystal display device, which greatly improves light transmittance and light extraction efficiency and also effectively overcomes the issue of color deviation at a large view angle.

To achieve the above object, the present invention provides a liquid crystal display device, which comprises: a liquid crystal panel and a collimated exit light backlight module that provides a light source to the liquid crystal panel. The liquid crystal panel comprises a color filter (CF) substrate, an array substrate that is arranged opposite to the CF substrate, and a liquid crystal layer that is filled between the CF substrate and the array substrate. The CF substrate has a surface that is distant from the liquid crystal layer and comprises an upper polarizer film arranged thereon. The array substrate has a lower surface that is distant from the liquid crystal layer and comprises a lower polarizer film arranged thereon. The upper polarizer film comprises a view angle diffusion film arranged thereon. The collimated exit light backlight module comprises two backlight sources, a metallic grating reflector plate that is set at lower ends of the two backlight sources to be located therebetween, a wire grid polarizer that is set at upper ends of the two backlight sources to be located therebetween, and an optic film assembly arranged above the wire grid polarizer. The two backlight sources, the metallic grating reflector plate, and the wire grid polarizer collectively define a light guide chamber.

The view angle diffusion film is a diffusive optic film made up of diffusion particles.

The view angle diffusion film adopts a prism-structure design. The view angle diffusion film has a lower surface on which a plurality of V-shaped projections is formed.

The view angle diffusion film comprises a plurality of diffractive optic units. The diffractive optic units are rectangular projections formed on the view angle diffusion film. A spacing distance between two adjacent ones of the diffractive optic units is equal to or less than a wavelength of a visible light.

The wire grid polarizer comprises a transparent substrate and a metal wire pattern formed on the transparent substrate.

The metal wire pattern has a pitch that is less than a wavelength of a visible light.

The optic film assembly comprises a microstructure brightness enhancement film. The microstructure brightness enhancement film generates a collimated exit light.

The microstructure brightness enhancement film adopts a prism-structured design.

The metallic grating reflector plate comprises a metallic grating pattern. The metallic grating pattern has a pitch that is equal to or less than a wavelength of a visible light. The liquid crystal panel is a one-domain or two-domain vertical alignment (VA) mode liquid crystal panel.

The efficacy of the present invention is that the present invention provides a liquid crystal display device, which comprises an arrangement of a view angle diffusion film to give a component of a normal-view-angle exit light to a large-view-angel exit light so as to greatly increase light transmittance and thus overcome the issue of color deviation at a large view angle; an arrangement of a wire grid polarizer to separate polarized lights so as to provide a polarized exit light and thus greatly improve utilization rate of the light entering the liquid crystal panel; and an arrangement of a metallic grating reflector plate to achieve conversion of the polarized lights, whereby the liquid crystal display device can greatly improve light transmittance and light extraction efficiency and may also effectively overcome the issue of color deviation at a large view angle.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
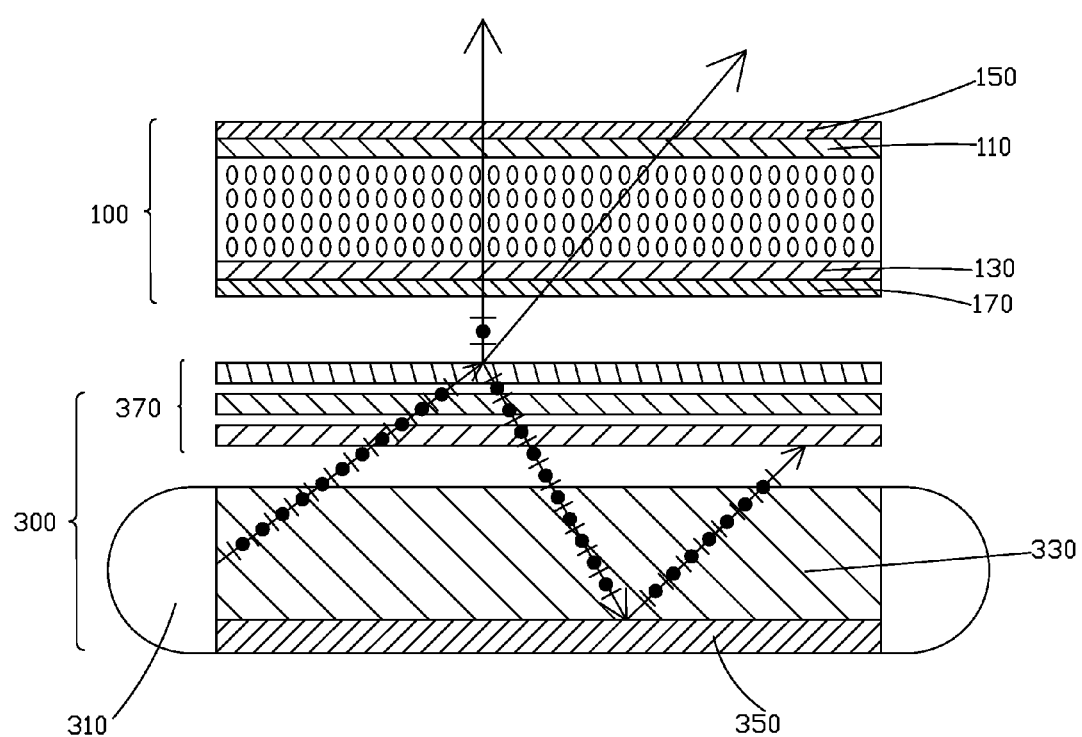
FIG. 1 is a schematic view showing the structure of a conventional liquid crystal display device.
Figure 2:
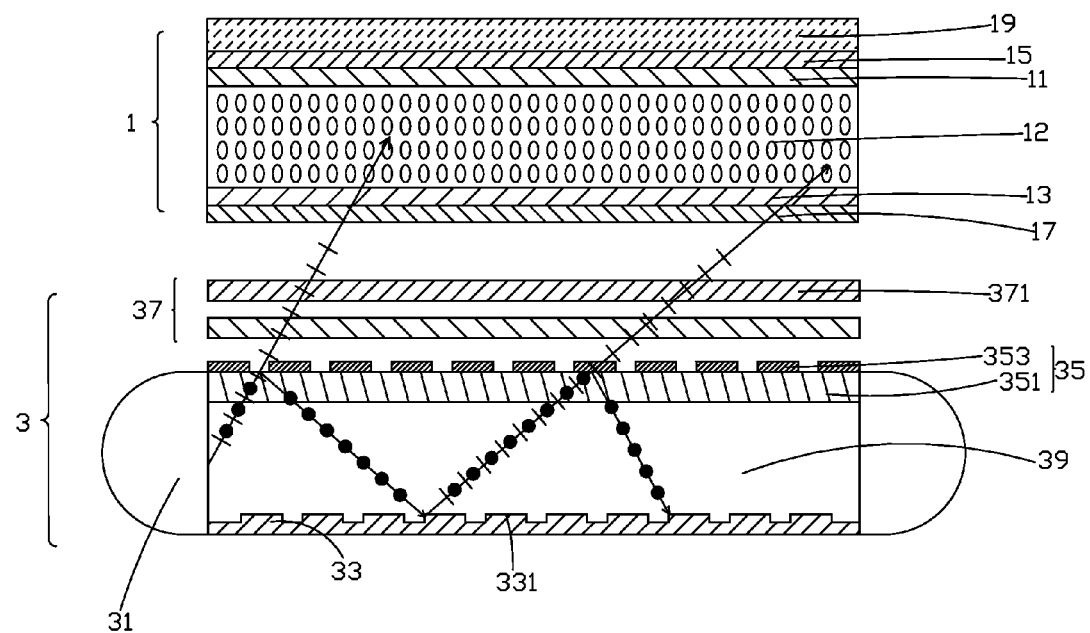
FIG. 2 is a schematic view showing the structure of a liquid crystal display device according to the present invention.

Referring to FIG. 2, the present invention provides a liquid crystal display device, which comprises a liquid crystal panel 1 and a collimated exit light backlight module 3 that provides a light source to the liquid crystal panel 1.

The liquid crystal panel 1 comprises a color filter (CF) substrate 11, an array substrate 13 that is arranged opposite to the CF substrate 11, and a liquid crystal layer 12 that is filled between the CF substrate 11 and the array substrate 13. The CF substrate 11 has an upper surface that is distant away from the liquid crystal layer 12 in a relative sense and comprises an upper polarizer film 15 attached thereto and a lower surface that is close to the liquid crystal layer 12 in a relative sense and comprises color resist arranged thereon by taking pixels as units. The array substrate 13 has a lower surface that is away from the liquid crystal layer 12 in a relative sense and comprises an upper polarizer film 15 that is normal to the lower polarizer film 17 in directions of axes thereof attached thereto and an upper surface that is close to the liquid crystal layer 12 in a relative sense and is provided with thin-film transistor (TFT) switches for charging/discharging the pixels. Formed atop the TFT switches is an indium tin oxide (ITO) electrode that controls the liquid crystal layer 12. The ITO electrode comprises a pattern design that can be a pattern fit for one-domain or two-domain vertical alignment (VA) mode liquid crystal panel. The one-domain or two-domain VA mode liquid crystal panel employs UV2A, PVA, or PSVA driving techniques, having an increased aperture ratio, enhanced liquid crystal performance, and a heightened light transmittance.

Figure 3:
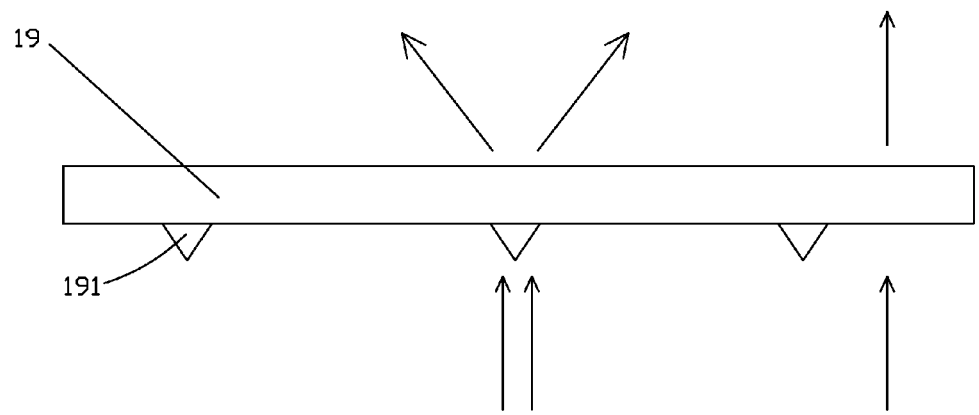
FIG. 3 is a schematic view showing an embodiment of a view angle diffusion film included in the liquid crystal display device according to the present invention.
Figure 4:
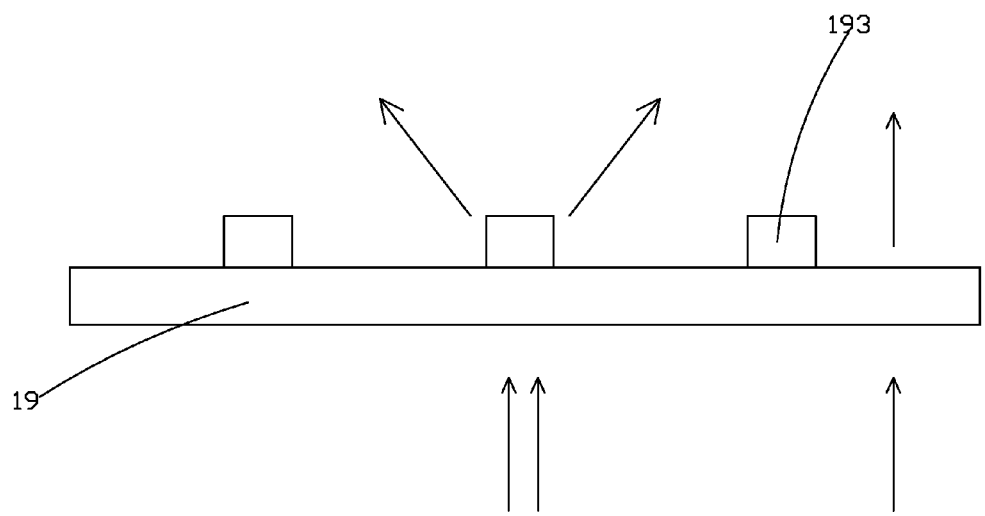
FIG. 4 is a schematic view showing another embodiment of a view angle diffusion film included in the liquid crystal display device according to the present invention.

It is noted here that the upper polarizer film 15 comprises a view angle diffusion film 19 arranged thereon. More specifically, the view angle diffusion film 19 is adhesively bonded on the upper polarizer film 15. The view angle diffusion film 19 can be a diffusive optic film composed of diffusion particles; or alternatively, as shown in FIG. 3, the view angle diffusion film 19 may use a prism-structured design having a lower surface comprising a plurality of V-shaped projections 191 formed thereon; or further alternatively, as shown in FIG. 4, the view angle diffusion film 19 may comprise a plurality of diffractive optic units 193, where the diffractive optic units 193 are rectangular projections formed on an upper surface of the view angle diffusion film 19 and a spacing distance between two adjacent ones of the diffractive optic units 193 is equal to or less than the wavelength of a visible light. The view angle diffusion film 19 functions to give a component of a normal-view-angle exist light to a large-view-angle exit light, meaning a component of an exit light that is normal to the liquid crystal panel 1 is given to an inclined exit light, so as to greatly reduce color deviation caused by the large-view-angle exit light directly transmitting through the liquid crystal panel 1 thereby overcoming the problem of color deviation at a large view angle and thus greatly improving light transmittance.

The collimated exit light backlight module 3 comprises two backlight sources 31, a metallic grating reflector plate 33 that is set at lower ends of the two backlight sources 31 to be located therebetween, a wire grid polarizer 35 that is set at upper ends of the two backlight sources 31 to be located therebetween, and an optic film assembly 37 arranged above the wire grid polarizer 35. The two backlight sources 31, the metallic grating reflector plate 33, and the wire grid polarizer 35 collectively define a light guide chamber 39.

Specifically, the two backlight sources 31 are respectively disposed at opposite sides of the liquid crystal display device and the backlight sources 31 are light-emitting diode (LED) light sources. The optic film assembly 37 comprises a microstructure brightness enhancement film 371, which may adopt a prism-structured design or other forms of structure. The microstructure brightness enhancement film 371 functions to generate a collimated exit light.

It is noted that wire grid polarizer 35 comprises a transparent substrate 351 and a metal wire pattern 353 formed on the transparent substrate, the metal wire pattern 353 having a pitch that is less than a wavelength of a visible light. The metallic grating reflector plate 33 comprises a metallic grating pattern 331. The metallic grating pattern 331 has a pitch that is equal to or less than a wavelength of a visible light. The wire grid polarizer 35 functions for S/P separation of polarized lights so as to provide a polarized exit light to thereby greatly improve utilization rate of the light entering the liquid crystal panel 1. Further, the wire grid polarizer 35 reflects the S-polarized light or the P-polarized light to be transmitted by the light guide chamber 39 to the metallic grating reflector plate 33 so that besides reflecting light, the metallic grating reflector plate 33 also converts the S-polarized light or the P-polarized light into a P-polarized light or an S-polarized light for reuse thereby reducing the percentage of light absorbed by the lower polarizer film 17, which is an absorptive film, further improving utilization rate of the light entering the liquid crystal panel 1

In summary, the present invention provides a liquid crystal display device, which comprises an arrangement of a view angle diffusion film to give a component of a normal-view-angle exit light to a large-view-angel exit light so as to greatly increase light transmittance and thus overcome the issue of color deviation at a large view angle; an arrangement of a wire grid polarizer to separate polarized lights so as to provide a polarized exit light and thus greatly improve utilization rate of the light entering the liquid crystal panel; and an arrangement of a metallic grating reflector plate to achieve conversion of the polarized lights, whereby the liquid crystal display device can greatly improve light transmittance and light extraction efficiency and may also effectively overcome the issue of color deviation at a large view angle.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising: a liquid crystal panel and a collimated exit light backlight module that provides a light source to the liquid crystal panel, the liquid crystal panel comprising a color filter (CF) substrate, an array substrate that is arranged opposite to the CF substrate, and a liquid crystal layer that is filled between the CF substrate and the array substrate, the CF substrate having a surface that is distant from the liquid crystal layer and comprises an upper polarizer film arranged thereon, the array substrate having a lower surface that is distant from the liquid crystal layer and comprises a lower polarizer film arranged thereon, the upper polarizer film comprising a view angle diffusion film arranged thereon, the collimated exit light backlight module comprising two backlight sources, a metallic grating reflector plate that is set at lower ends of the two backlight sources to be located therebetween, a wire grid polarizer that is set at upper ends of the two backlight sources to be located therebetween, and an optic film assembly arranged above the wire grid polarizer, the two backlight sources, the metallic grating reflector plate, and the wire grid polarizer collectively defining a light guide chamber;

wherein the view angle diffusion film comprises a plurality of diffractive optic units, the diffractive optic units comprising rectangular projections formed on the view angle diffusion film, a spacing distance between two adjacent ones of the diffractive optic units being equal to or less than a wavelength of a visible light.

2. The liquid crystal display device as claimed in claim 1, wherein the wire grid polarizer comprises a transparent substrate and a metal wire pattern formed on the transparent substrate.

3. The liquid crystal display device as claimed in claim 2, wherein the metal wire pattern has a pitch that is less than a wavelength of a visible light.

4. The liquid crystal display device as claimed in claim 1, wherein the optic film assembly comprises a microstructure brightness enhancement film, the microstructure brightness enhancement film generating a collimated exit light.

5. The liquid crystal display device as claimed in claim 4, wherein the microstructure brightness enhancement film comprises a prism-structured design.

6. The liquid crystal display device as claimed in claim 1, wherein the metallic grating reflector plate comprises a metallic grating pattern, the metallic grating pattern having a pitch that is equal to or less than a wavelength of a visible light.

7. The liquid crystal display device as claimed in claim 1, wherein the liquid crystal panel comprises a one-domain or two-domain vertical alignment (VA) mode liquid crystal panel.

* * * * *